United States Patent [19]
Hayes, Jr. et al.

[11] Patent Number: 5,960,099
[45] Date of Patent: Sep. 28, 1999

[54] SYSTEM AND METHOD FOR CREATING A DIGITIZED LIKENESS OF PERSONS

[76] Inventors: Carl Douglas Hayes, Jr.; Lucy Johnson Hayes; Laura Yelder Johnson, all of 11303 Cloverhill Dr., Silver Springs, Md. 20902

[21] Appl. No.: 08/806,059

[22] Filed: Feb. 25, 1997

[51] Int. Cl.[6] .................................................. G06K 9/00
[52] U.S. Cl. .......................... 382/118; 382/117; 382/203; 382/206; 382/285
[58] Field of Search .................................. 382/118, 117, 382/203, 206, 285, 100, 199, 283, 154, 286, 276; 396/338, 5; 345/431, 432, 433, 507

[56] References Cited

U.S. PATENT DOCUMENTS

| | | | |
|---|---|---|---|
| 3,741,098 | 6/1973 | Cannon | 95/37 |
| 4,276,570 | 6/1981 | Burnson et al. | 382/276 |
| 4,404,684 | 9/1983 | Takada | 383/154 |
| 4,752,964 | 6/1988 | Okada et al. | 382/154 |
| 4,754,487 | 6/1988 | Newmuis | 382/2 |
| 4,843,568 | 6/1989 | Krueger et al. | 364/518 |
| 4,975,969 | 12/1990 | Tal | 382/2 |
| 4,996,994 | 3/1991 | Steinhauer et al. | 128/774 |
| 5,299,301 | 3/1994 | Nohmi et al. | 345/431 |
| 5,307,452 | 4/1994 | Hahn et al. | 345/432 |
| 5,319,742 | 6/1994 | Edgar | 345/431 |
| 5,380,206 | 1/1995 | Asprey | 434/257 |
| 5,467,441 | 11/1995 | Stone et al. | 345/433 |
| 5,469,536 | 11/1995 | Blank | 345/431 |
| 5,479,529 | 12/1995 | Nakagawa | 382/118 |
| 5,490,238 | 2/1996 | Watkins | 345/422 |
| 5,533,186 | 7/1996 | Tanahashi et al. | 345/507 |
| 5,625,704 | 4/1997 | Prasad | 382/118 |
| 5,695,646 | 12/1997 | Sekiguchi et al. | 434/365 |
| 5,805,745 | 9/1998 | Graf | 381/291 |

FOREIGN PATENT DOCUMENTS

586082  9/1994  European Pat. Off. .

*Primary Examiner*—Jose L. Couso
*Assistant Examiner*—Kanji Patel
*Attorney, Agent, or Firm*—Richard C. Litman

[57] ABSTRACT

A system and method for producing a digitized likeness of a person. The system includes a digital computer and a scanning device operatively coupled to the digital computer. Headshot photographs of a person are scanned and the data is transmitted to the digital computer. A program is provided for manipulating the data and reconstructing a digital image for display on the digital computer. The program allows customization of the expressions on the face of the digital image. The program also allows enlargement and reduction of the digitized likeness while maintaining necessary proportional relations. The program also allows integration and data transfer to a Computer Aided Manufacturing (CAM) system so that three dimensional contours and depressions corresponding to facial features may be automatically reproduced.

4 Claims, 10 Drawing Sheets

SYSTEM AND METHOD FOR CREATING A DIGITIZED LIKENESS OF PERSONS

BACKGROUND OF THE INVENTION

1. Field of the Invention

The present invention relates to image processing systems and more particularly to an image processing system which allows manipulation of facial features.

2. Description of the Prior Art

Recent advancements in computer technology have provided users with abilities and conveniences previously unimagined. One well known application of computers is that of generating and manipulating images. Such images range from plots of mathematical functions and relationships to detailed drawings, all of which are generated for viewing on a display screen. In other instances, an image may be digitized for later enhancement or alteration on the computer system. Since the image is in digitized form, it may be stored, transmitted, and printed as any other form of computer information or data.

It is common to execute painting programs in the memory of a digital computer in order to create an environment wherein images may be created, displayed, and manipulated using a selection device such as a mouse or stylus. The painting program reconfigures the memory of the digital computer in a manner analogous to that of a canvas upon which an image is created. This information is transmitted to a display screen for instantaneous viewing by the user. The program allows the mouse to function as a normal selection device or a paintbrush, based on the relative position of the mouse on the display screen. One area of the display screen may be used to select operations designed to manipulate the image. In another area of the display screen, the mouse functions as a cursor having a user-selectable brush image.

A typical painting program will provide the user with numerous options. For example, various colors may be selected when painting. New colors may be created by mixing available colors. Various brush sizes and shapes may be selected. There are several basic tools which the user may select to create the image. A pencil tool allows a user to draw lines in freehand using the mouse. A paint tool is used to add paint to a specified area while an eraser tool will remove painted portions of an the image. Basic geometric patterns such as circles, ellipses, rectangles, squares, may also be created with ease. Finally, a magnifying tool is often available to allow detailed manipulation of a portion of the image.

While paint programs provide user with numerous tools for creating and manipulating images, they do not allow the creation or manipulation of facial features. Nowadays, it is often desirable to provide children with customized gifts. Such gifts often include personalized storybooks where the main character shares the child's name, for example. These storybooks are usually available in digital format so that the child may use the book in conjunction with a digital computer. While a common name provides a certain bond between the child and the main character, it should be appreciated that this bond could be further increased if the main character was also in the image of the child. Thus, the child would feel as though the storybook were created especially for them and about them.

There are numerous methods and systems currently available for manipulating images using a digital computer. For example, U.S. Pat. No. 4,276,570 issued on Jun. 30, 1981 to Burson et al. discloses a method and apparatus for producing an image of a person's face at a different age. In order to simulate the appearance of a different age on a person's face, a picture of an old face and a corresponding young face are recorded and the differences between the old and young face are found and recorded. A picture of the person's face to be simulated at a different age is then recorded, modified with the differences, and the image resulting after modification is displayed.

U.S. Pat. No. 5,299,301 issued on Mar. 29, 1994 to Nohmi et al. discloses an image displaying method and apparatus. The attribute data of a designated region on the displayed image is stored. Next, the attribute of a partial image corresponding to the region designated on the display screen is retrieved, or the region of the partial image having a predetermined attribute that includes the attributes retrieved by the first step is picked.

U.S. Pat. No. 5,307,452 issued on Apr. 26, 1994 to Hahn et al. discloses a method and apparatus for creating, manipulating, and displaying images. The invention permits a user to manipulate a high resolution source image through interaction with a lower resolution display image. User operations are interpreted by a paint system processor and executed on the source image in real time. A combiner feature allows operations to be described as mathematical expressions, where operands are images and operators are chosen from a list of special related operators. The source image is stored in location A and the current user operation is executed in location B. The combiner feature Joins images A and B to display the result on the display.

U.S. Pat. No. 5,319,742 issued on Jun. 7, 1994 and European Patent Application # 586,082 published on Apr. 9, 1994, both to Edgar, disclose an image enhancement with mask having fuzzy edges. A mask having at lease two areas is defined over an image. The mask pixels are mapped with an error diffusion or dithering process in order to mix the mask pixels between the areas. Image pixels corresponding in position to the mask pixels are mapped to color palettes selected for the two areas. An image effect is applied to the color palette of the unmasked area. The error diffusion thus provides a fuzzy edge to the mask and the process may be accomplished with a minimum number of states.

U.S. Pat. No. 5,467,441 issued on Nov. 14, 1995 to Stone et al. discloses a method for operating on objects in a first image using an object-based model data structure to produce a second contextual image having added, replaced, or deleted objects. A processor-controlled machine allows a user to operate on an object-based model data structure from which a first image has been produced in order to apply any of a number of spatially and temporally bounded changes to the first image in a second image which is displayed in the spatial context of the first image. The method is implemented as an enhancement to the functionality of an application program, such as a graphical object editor. The method performs the operations on a copy of the model data structure, thus permitting the user to instantly preview changes to an image before actually applying those changes.

U.S. Pat. No. 5,469,536 issued on Nov. 21, 1995 to Blank discloses an image editing system including masking capability. The system allows editing of digital images in three dimensions and includes a computer for storing a digital image of an object and a background, as well as at least one additional background image. Based upon the difference between the hues of the edge of the object and the surrounding background and a predetermined hue difference, the computer locates the edge of the object and removes portions of the image which are outside the edge. The object can then be combined with a preselected one of the other background images so as to form a composite image.

U.S. Pat. No. 5,479,529 issued on Dec. 26, 1995 to Nakagawa et al. discloses a character and fortune telling method and apparatus for hobby use. The apparatus includes an input unit for generating a two-dimensional image based on a person's face. A feature extraction unit is provided for extracting the coordinates and distances expressing the shapes and positions of the face from the two-dimensional image. The apparatus further includes an output unit for producing personal information about a person from the extracted features and for directing the information to an output device.

U.S. Pat. No. 5,490,238 issued on Feb. 6, 1996 to Watkins discloses an attribute blending system for composing computer-graphic images from objects. Objects contending for representation in pixels of a graphics display are selectively awarded a fractional area within a pixel based on: coarse calculations in the Z dimension, aggregate demands of the objects, and blending techniques free of binary position resolutions. The area occupied by a polygon within a pixel is represented using a single number in the form of a variable. For example, a value of "0" may be used to indicate that no area is occupied within the pixel, while a value of "255" may indicate that the entire area is occupied. Blending techniques with attendant antialiasing are used to avoid calculations in the Z dimension.

U.S. Pat. No. 5,533,186 issued on Jul. 2, 1996 to Tanahashi et al. discloses an image filing method based on symbol retrieval condition. A plurality of images are registered one by one and subsequently retrieved by adding a retrieval condition so as to minimize the registration and retrieval times. A plurality of symbols for featuring objects in the images are preset, and the images are registered in accordance to the selected symbols. At the image retrieval time, the symbols are selected, and the images corresponding to the selected symbols are read out.

None of the above inventions and patents, taken either singularly or in combination, is seen to describe the instant invention as claimed.

SUMMARY OF THE INVENTION

Accordingly, it is a principal object of the invention to provide a method of creating a digitized likeness of a person.

It is another object of the invention to provide a method of creating a three dimensional digitized likeness of a person.

It is a further object of the invention to provide a system for creating a digitized likeness of a person.

It is an object of the invention to provide improved elements and arrangements thereof in a system for creating a digitized likeness of persons on paper, plastic or other material for the purposes described which is inexpensive, dependable and fully effective in accomplishing its intended purposes.

In accordance with the objects of the invention, a method is provided for creating a digitized likeness of a person. The method allows the digitized likeness created to be in the form of a two dimensional image suited for reproduction on paper, plastic, or other materials. Alternatively, the digitized likeness may be in the form of a three dimensional sculpture. A headshot photograph of the person whose likeness is to be digitized is initially scanned. Depending on the specific orientations of the image desired, it may be necessary to scan two headshot photographs, a frontal view and a side view. Once scanned, data representative of the image on the photograph is transmitted to a digital computer. A digital camera or similar device may also be used to capture the image and produce digital data capable of being transferred directly to the digital computer. The image is displayed on a viewing device and a coordinate grid is superimposed on the image. Point coordinates corresponding to facial features are identified using geometric shape inferences. Mathematical equations and formulas are applied to the geometric shape inferences in order to determine the natural layout of the facial features of the image. Once the natural layout of the face is determined, the mathematical equations may be further applied to manipulate the geometric shape inferences, thereby simulating various facial expressions such as a smile or a frown.

The digital likeness created, along with the facial expressions, may consist of two dimensional or three dimensional data. The two dimensional data allows the digital likeness created to be reproduced on flat surfaces such as paper, plastic, etc. The three dimensional data allows integration with a Computer Aided Manufacturing (CAM) system so that the digital likeness created is in the form of a sculpture which may be formed from plastic or various other material.

In accordance with another object of the invention, a system is provided for producing a digitized likeness of a person. The system includes a digital computer having a display device, a selection device such as a mouse or stylus, memory, and data storage and retrieval devices such as disk drives. A scanning device Is operatively coupled to the digital computer for transforming headshot photographs of the person into data suited for manipulation by the digital computer. A program, executable in the memory of the digital computer, is provided for reconstructing a digital image based on the data. The program allows an operator to modify various features on the digital image. The program also allows enlargement and reduction of the digital image. The program also allows integration and data transfer to a CAM system so that three dimensional contours and depressions corresponding to facial features may be automatically reproduced.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
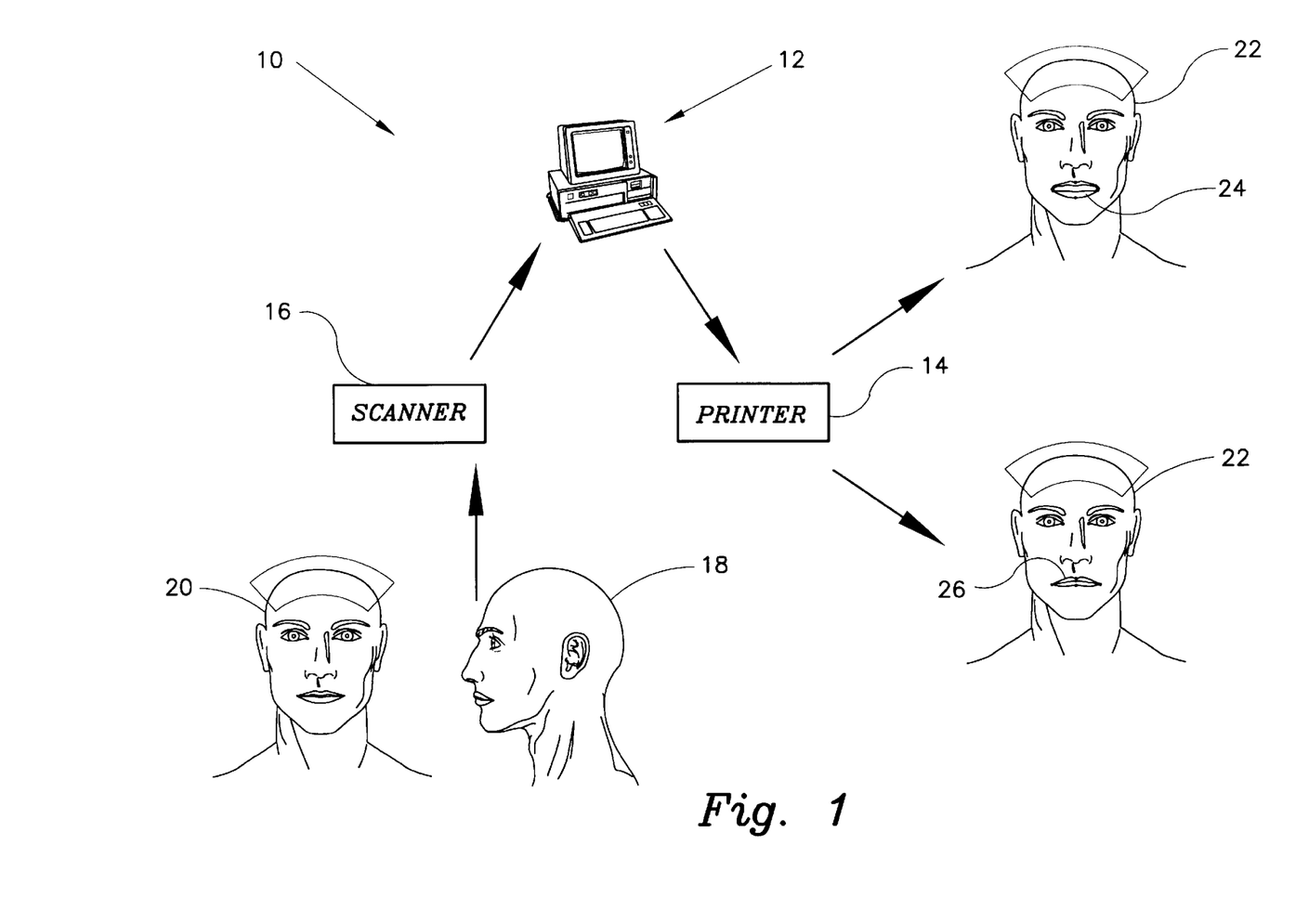
FIG. 1 is a process chart illustrating the procedure for creating a digitized likeness of a person.

With reference to the drawings and initially to FIG. 1, a system 10 is shown for producing a digitized likeness 22 of a person. The system 10 includes a digital computer 12 having a display device, a selection device such as a mouse or stylus, memory, and data storage and retrieval devices such as a disk drive. A printer 14 and a scanner 16 are coupled to the digital computer 12. The scanner 16 scans a first and second headshot photograph 18, 20 and produces corresponding data which is transmitted to the digital computer 12. The first headshot photograph 18 contains a side view of the person whose likeness is to be digitized, while the second headshot photograph 20 contains a frontal view of the person. Alternatively, a digital camera or similar device may be used to capture a side view and frontal view of the person. The digital data produced can subsequently be transferred directly to the digital computer. The digital computer 12 executes a program which allows an operator to view the digital image on the display device. The program also allows the operator to manipulate the data in order to modify various features of the digital image. As seen in FIG. 1, the digitized likeness 22 created may be manipulated to incorporate a smile 24 or a frown 26. The operator may also elect to enlarge or reduce the digital image. Once the operator is satisfied with the digital image created, they may choose to paste it electronically to a document or desired program. The operator may also use the attached printer 14 to reproduce the digitized likeness 22. Depending on the specific application, various scanners 16 may be used. For example, if the digitized likeness 22 being created will be reproduced in a color environment, then it becomes necessary to use a color scanner, preferably one which offers true color capabilities. It should be appreciated by those skilled in the art that the digital camera should also be appropriately selected for black and white, or color requirements. However, if the digitized likeness 22 will be reproduced on a surface, such as plastic, where color is not essential, then a black and white scanner will suffice. Likewise, the printer 14 used may include color capabilities.

Figure 2:
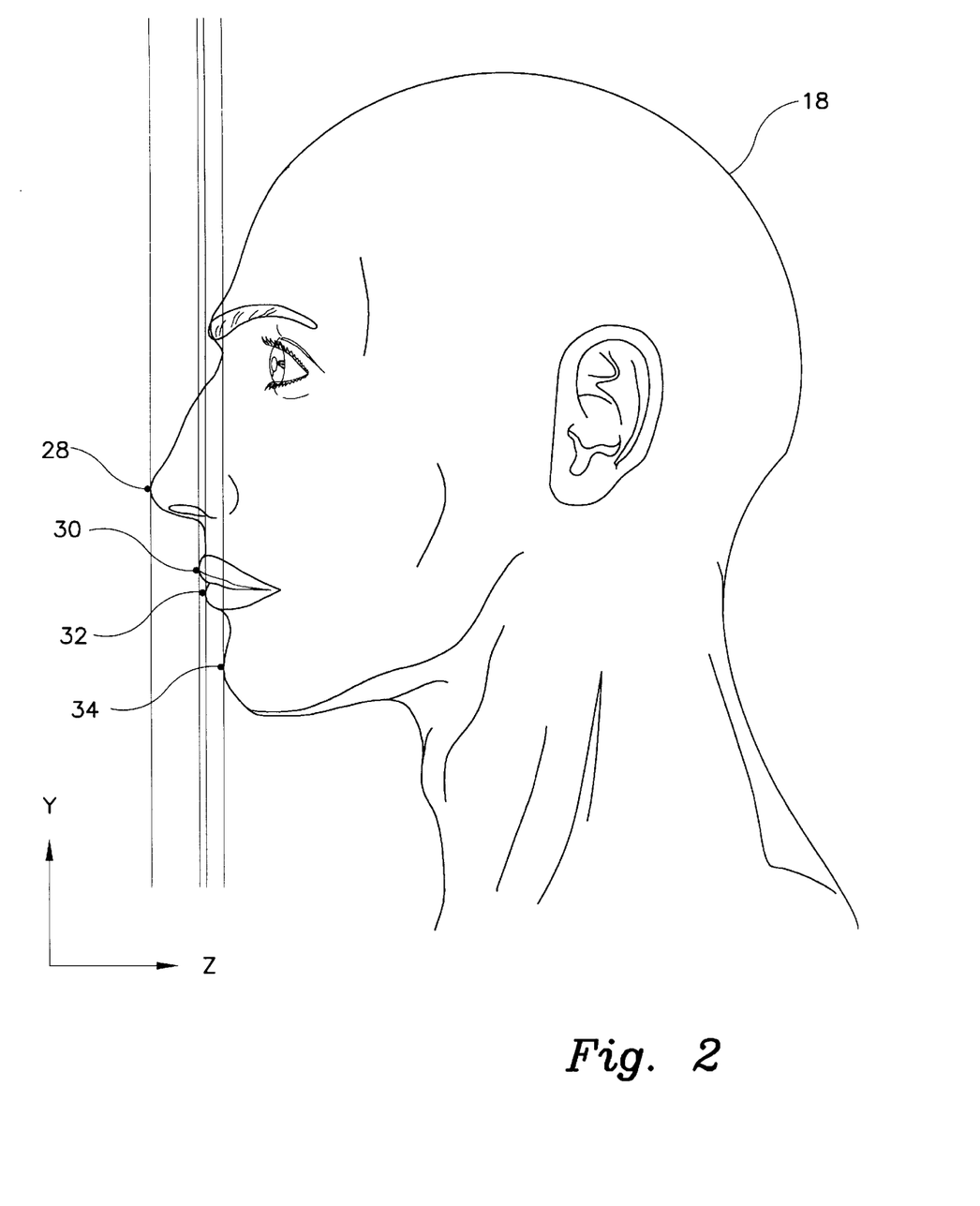
FIG. 2 is a side elevational view of an image to be digitized.
Figure 3:
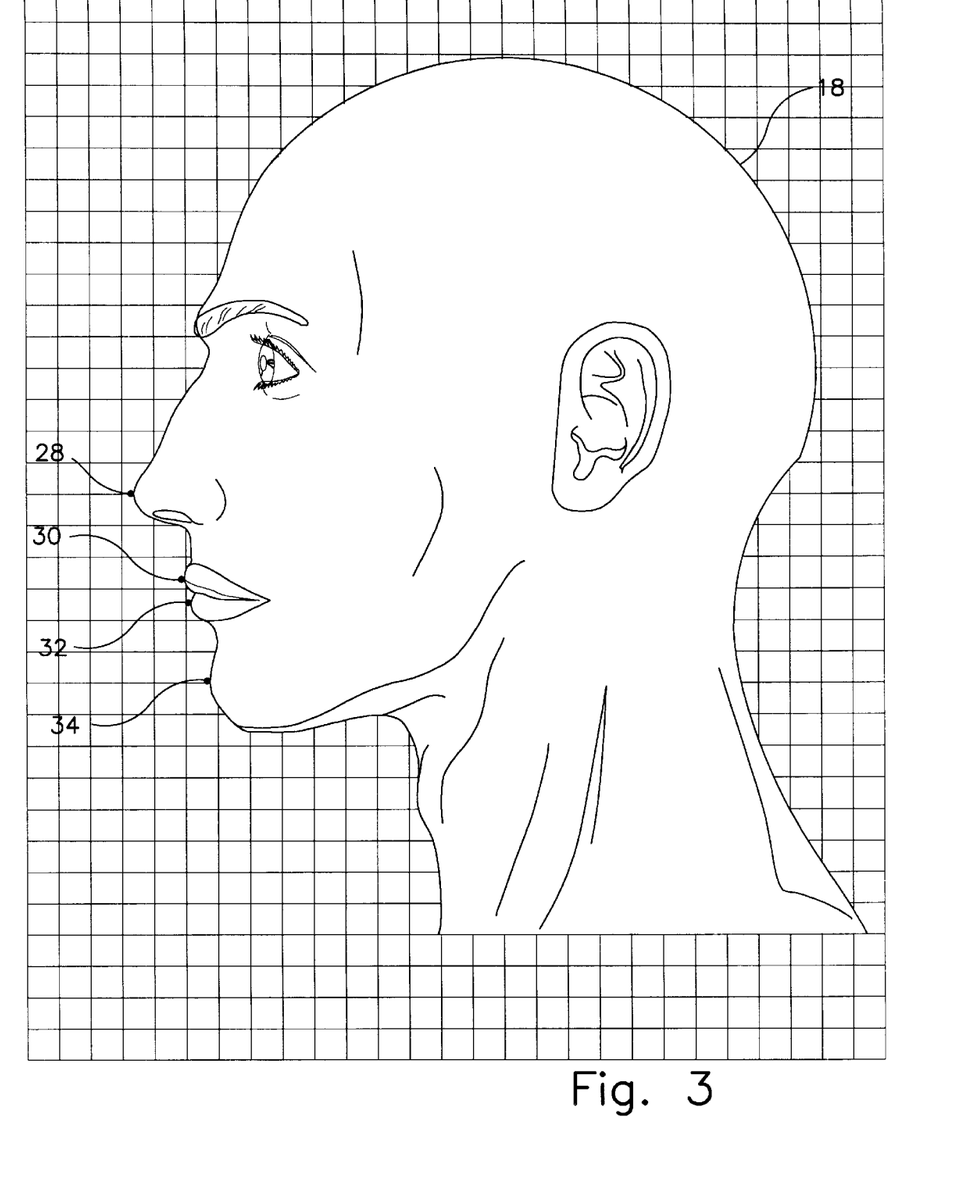
FIG. 3 is a side elevational view illustrating the alignment of a first coordinate grid.

With continued reference to FIG. 1, the process of creating a digitized likeness of a person will be described. The first and second 18, 20 headshot photographs containing side and frontal views of the person are scanned. The data resulting from the scanning procedure is transmitted to the digital computer 12. The digital computer 12 executes a program in memory which interprets the data and displays the scanned image on an attached display device. The first headshot photograph 18 is examined and four high points 28, 30, 32, 34 are calculated. As seen in FIG. 2, the high points 28, 30, 32, 34 are defined as the most outward points on the face. A first coordinate grid is superimposed on the image constructed from the first headshot photograph 18. As seen in FIG. 3, the first coordinate grid is a plane defined by the Y and Z axes. Next, the software moves the first grid to align it with the highest point 28. The highest point 28 is defined as the high point having the highest value along the Y-axis, as measured from the bottom of the image to the top. The software assumes the highest point 28 to be the tip of the nose. The next two high points 30, 32 are assumed to be the upper and lower lip, respectively. Likewise, the fourth high point 34 is assumed to be the person's chin. Each high point 28, 30, 32, 34 is identified by a corresponding grid cell. The coordinates of the high points 28, 30, 32, 34 are determined and saved.

Figure 4:
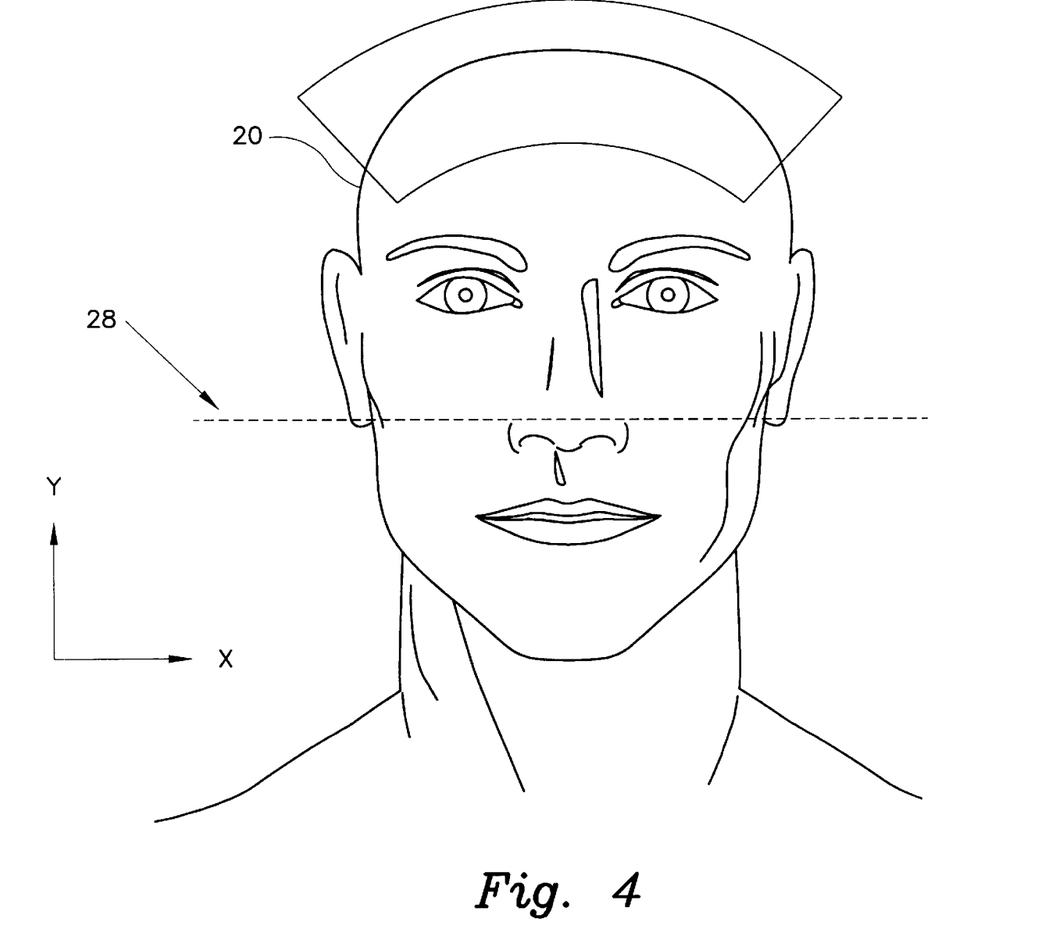
FIG. 4 is a front elevational view of the image to be digitized.
Figure 5:
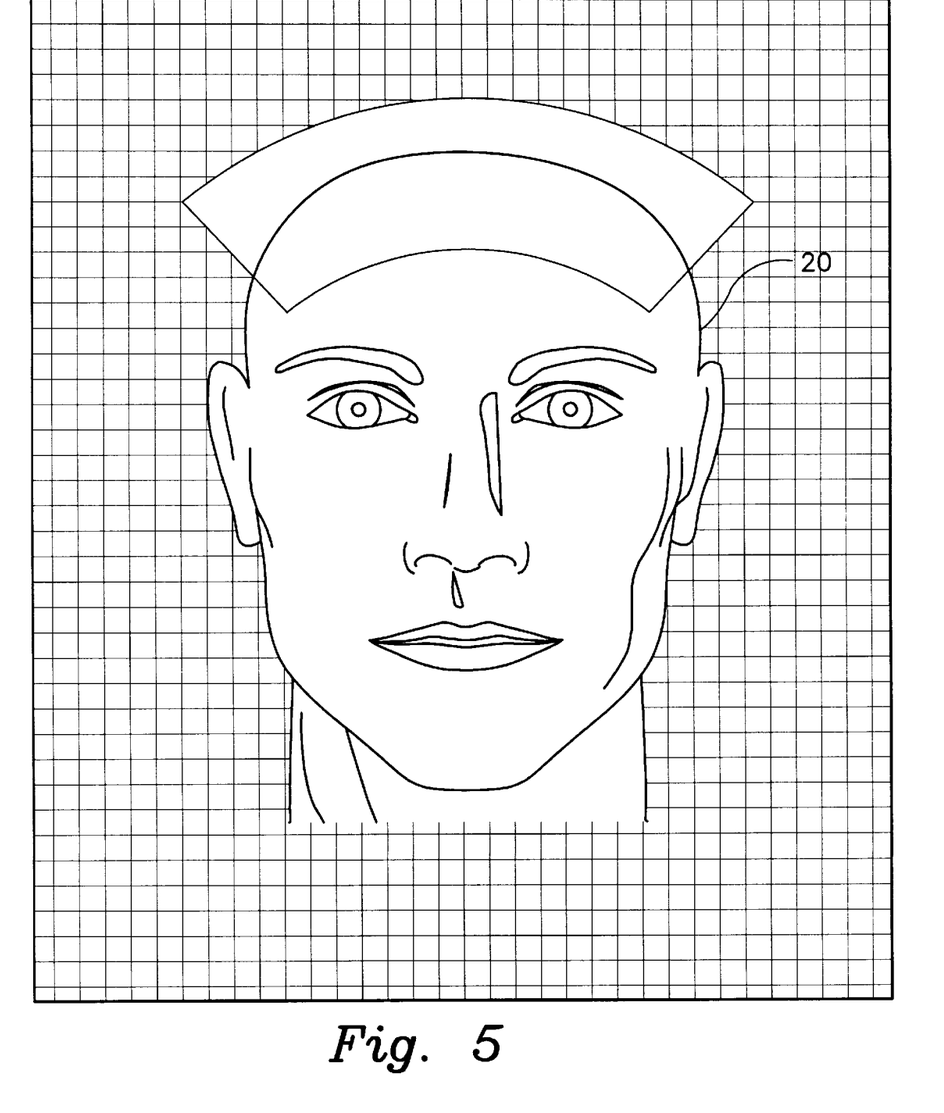
FIG. 5 is a front elevational view illustrating alignment of a second coordinate grid.

Turning now to FIGS. 4 and 5, a similar procedure is performed on the second headshot photograph 20. The second headshot photograph 20 is scanned and the resulting data is transmitted to the digital computer 12. The software determines the location of the tip of the nose along the X-axis, generally indicated by the numeral 28. A second coordinate grid, which is defined by the X-Y plane, is superimposed on the second headshot photograph 20. The program moves the second coordinate grid so that the origin is in alignment with the tip of the nose. Thus, the tip of the nose is aligned with the highest point 28 from the first headshot photograph 18.

Figure 6:
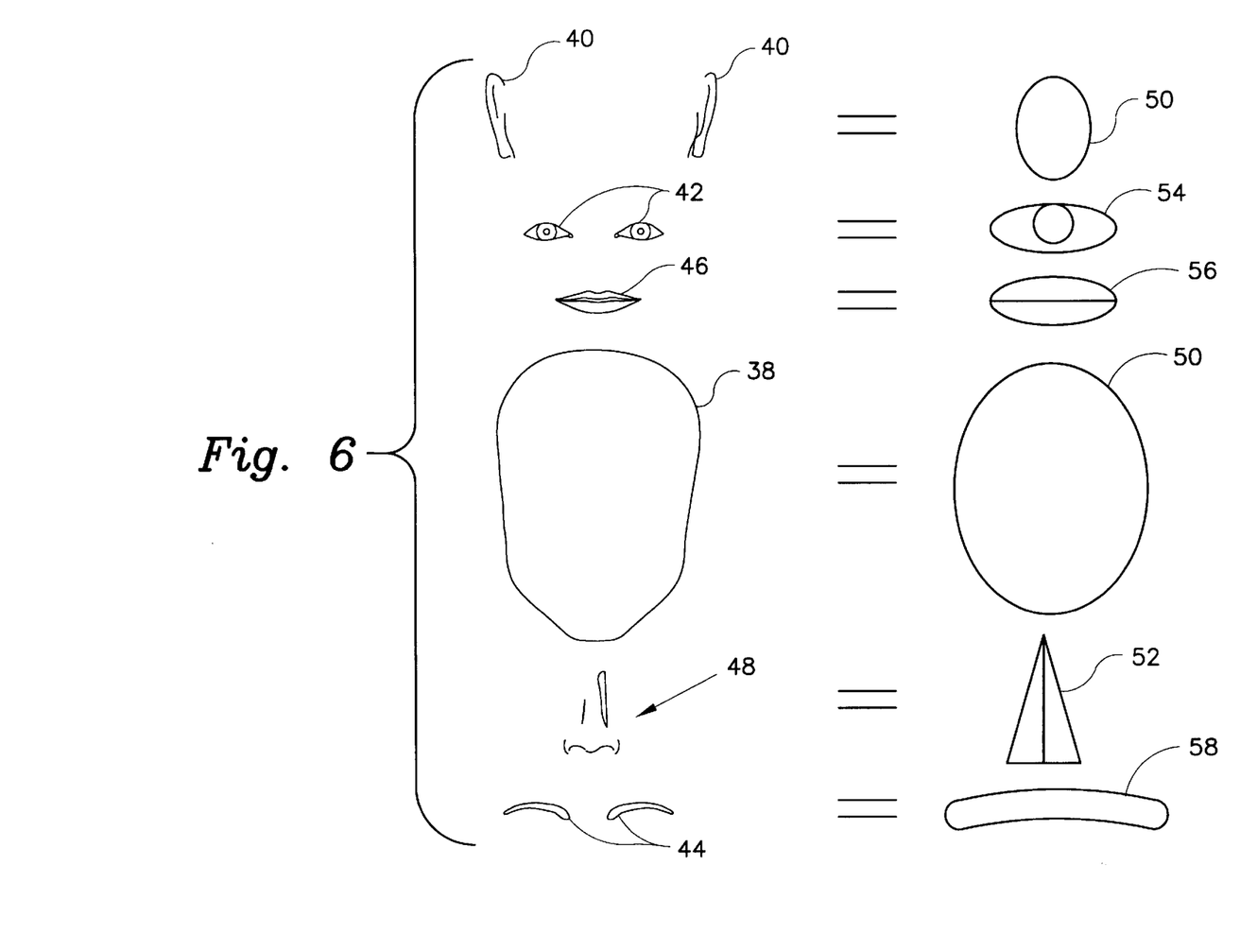
FIG. 6 illustrates the relationship between facial features and geometric shapes.

Next, the program identifies point coordinates for facial features on the first and second coordinate grids using geometric shape inferences. FIG. 6 illustrates a number of facial features and their corresponding geometric shape inferences. The face 38 is generally associated with an ellipse 50 having its major diameter oriented in the vertical direction. Likewise, each ear 40 is associated with a vertically oriented ellipse 50. The eyes 42 are associated with a horizontally oriented ellipse having a circle centrally disposed therein 54. Each eyebrow 44 is associated with an arch-shaped member 58. The mouth 46 is associated with a horizontally oriented ellipse having a line segment along its major diameter 56. Finally, the nose 48 is associated with a triangle which has a vertical line perpendicular to its base and extending vertically in such a manner as to bisect the angle opposite the base 52. Additionally, the hair on the image may be associated with a semi-sphere; the cheeks may be associated with the combination of a sphere and an arch; the chin may be associated with a triangle superimposed on a rectangle.

Figure 7:
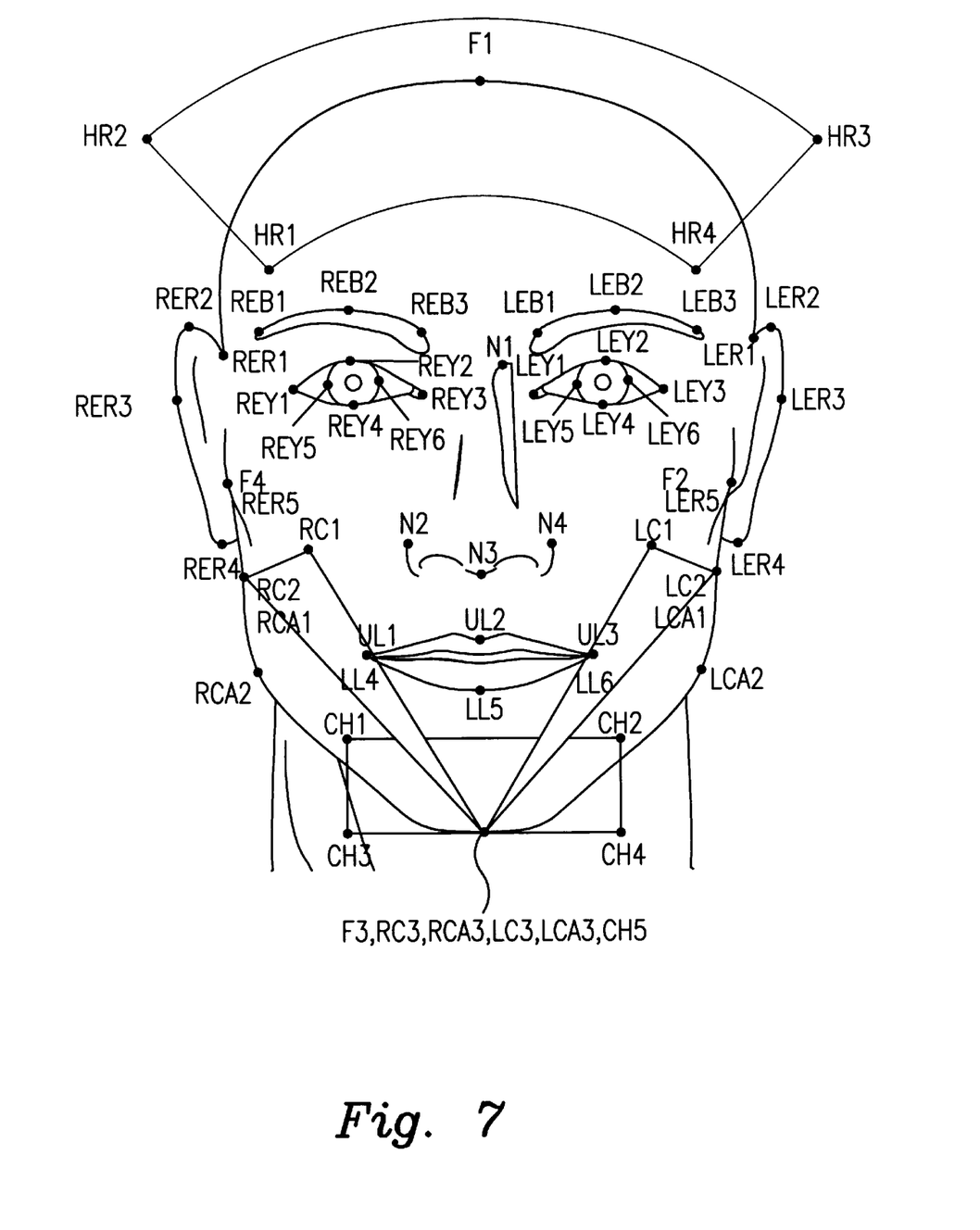
FIG. 7 is a front elevational view illustrating the landmark points of key facial features.

Turning now to FIG. 7, reconstruction of the frontal view of the face using the geometric shapes is illustrated. The program assigns landmark points to each facial feature based on the associated geometric shape. Table 1 lists the facial features identified by the program and the nomenclature used for the landmark points associated with each feature.

TABLE 1

| FACIAL FEATURE | LANDMARK POINTS |
|---|---|
| Hair | HR1 |
|  | HR2 |
|  | HR3 |
|  | HR4 |
| Face | F1 |
|  | F2 |
|  | F3 |
|  | F4 |
| Right Eyebrow | REB1 |
|  | REB2 |
|  | REB3 |
| Left Eyebrow | LEB1 |
|  | LEB2 |
|  | LEB3 |
| Left Eye | LEY1 |
|  | LEY2 |
|  | LEY3 |
|  | LEY4 |
|  | LEY5 |
|  | LEY6 |
| Right Eye | REY1 |
|  | REY2 |
|  | REY3 |
|  | REY4 |
|  | REY5 |
|  | REY6 |
| Left Cheek | LC1 |
|  | LC2 |
|  | LC3 |

TABLE 1-continued

| FACIAL FEATURE | LANDMARK POINTS |
|---|---|
|  | LCA1 |
|  | LCA2 |
|  | LCA3 |
| Right Cheek | RC1 |
|  | RC2 |
|  | RC3 |
|  | RCA1 |
|  | RCA2 |
|  | RCA3 |
| Nose | N1 |
|  | N2 |
|  | N3 |
|  | N4 |
| Left Ear | LER1 |
|  | LER2 |
|  | LER3 |
|  | LER4 |
|  | LER5 |
| Right Ear | RER1 |
|  | RER2 |
|  | RER3 |
|  | RER4 |
|  | REP5 |
| Upper Lip | UL1 |
|  | UL2 |
|  | UL3 |
| Lower Lip | LL4 |
|  | LL5 |
|  | LL6 |
| Chin | CH1 |
|  | CH2 |
|  | CH3 |
|  | CH4 |
|  | CH5 |

Figure 8:
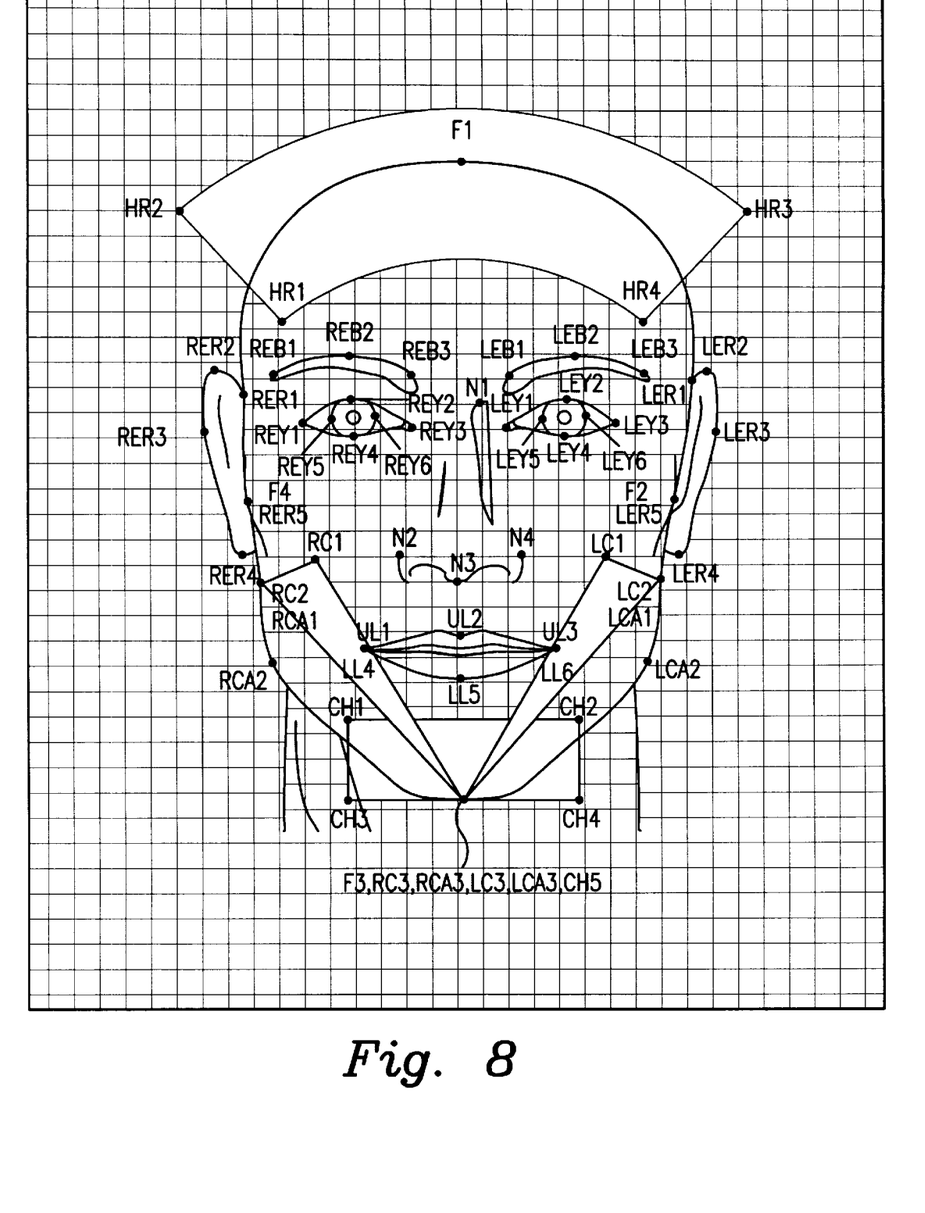
FIG. 8 is a front elevational illustrating the determination of coordinates for landmark points.

Referring to FIG. 8, the second coordinate grid is superimposed on the image and aligned such that the origin is positioned at the tip of the nose, i.e., the highest point 28. Once the second coordinate grid is properly aligned, the coordinates of each landmark point are calculated. The program includes various parameters and assumptions designed for use in assigning values to the coordinates points when the precise location of such points is unclear.

Figure 9:
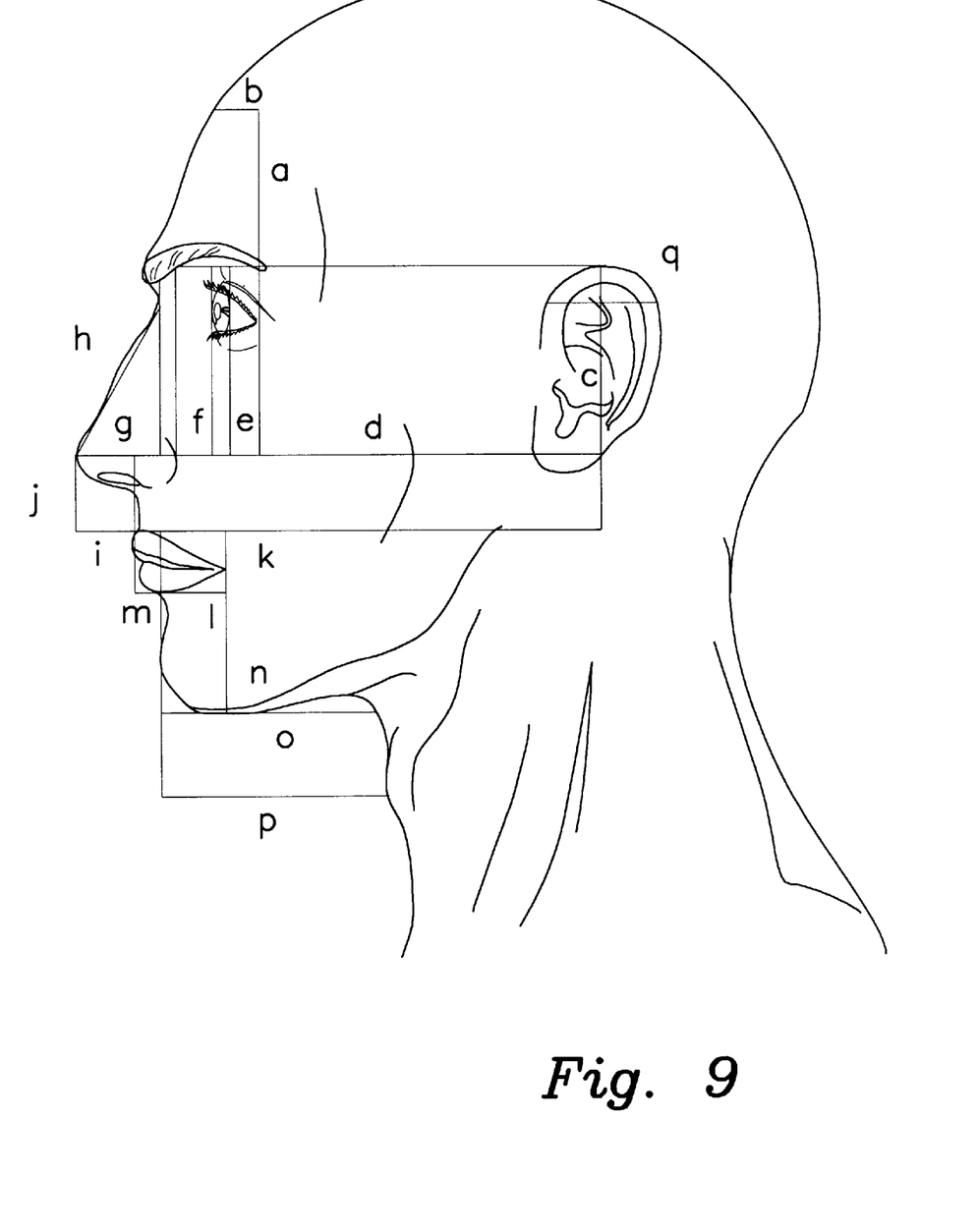
FIG. 9 is a side elevational view illustrating the determination of the natural layout of facial features.

Next, the software applies several mathematical equations and formulas to the image captured from the first headshot photograph 18, as seen in FIG. 9. The mathematical equations are designed to calculate the natural layout of landmark points on the image. The program makes the assumption that every face is symmetrical. Thus, the coordinates determined can be mirrored for use on the opposite side of the face. The mathematical equations are also applied to the image captured from the second headshot photograph 20. The program allows the user to customize the first and second coordinate grids so that real world dimensions may be applied to the points if necessary. Thus, the distance between landmark points calculated by taking the absolute value of the difference between landmark points. Consider a coordinate grid wherein each cell is dimensioned as a 1 mm×1 mm square. Next, consider two landmark points which are spaced four grid cells apart. The two landmark points have the same X-coordinate and different Y-coordinates. The distance between the two landmark points is thus 4 units. If the grid cell dimensions are applied, then the distance becomes 4 millimeters. Tables 2 and 3 list the variables and mathematical equations used in determining the layout of the face in correspondence with FIG. 9 and FIG. 10, respectively.

TABLE 2

| VAR | DEFINITION |
|---|---|
| b + ? | Circumference between middle of forehead to farthest point of eyelid. "?" is arbitrariiy assigned by user |
| a | height from top of forehead to farthest point of eyelid |
| d+e+f | distance from nose bridge N1 to tip of ear RER2 |
| h | length of nose from bridge tip N1 to nose tip N3 based on equation: $h^2 = 8^2 + c^2$ |
| j | height from nose tip N3 to upper lip UL2 along Y-axis |
| k | height from upper lip UL2 to lower lip LL5 along Y-axis |
| i | depth from nose tip N3 to upper lip UL2 along Z-axis |
| m | dist. from upper lip UL2 to lower lip LL5 along Z-axis |
| L | length of lower lip from LL5 to LL4 and LL5 to LL6 |
| m + L | length of upper lip from UL2 to UL1 and UL2 to UL3 |
| n | height between lower lip tip LL5 and chin bottom CH5 |
| p | distance from chin tip CH5 to back of right cheek RCA2 |
| q | width of ears from RER1 to RER3 and LER1 to LER3 |

TABLE 3

Figure 10:
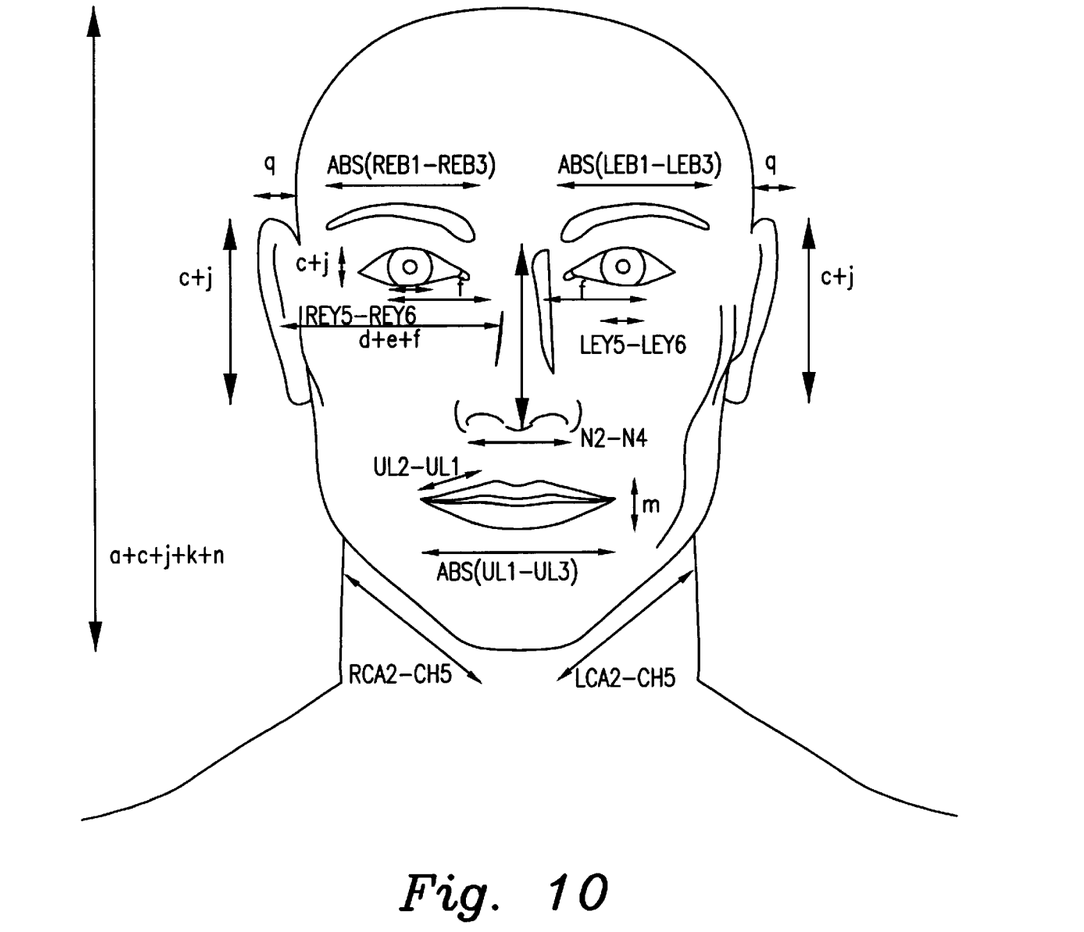
FIG. 10 is a front elevational view illustrating the mathematical determination of dimensions of facial features.

| Equation | Definition |
|---|---|
| abs(REB1 − REB3) | right eyebrow length |
| abs(LEB1 − LEB3) | left eyebrow length |
| abs(c + j) | height of each eye from upper lip |
| abs(REY5 − REY6) | width of right pupil |
| abs(LEY5 − LEY6) | width of left pupil |
| q = abs(RER1 − RER3) | width of right ear |
| q = abs(LER1 − LER3) | width of left ear |
| abs(N1 − N3) | length of nose from bridge to tip |
| abs(N2 − N4) | width of nose from right to left nostril |
| abs(UL1 − UL3) | length of each lip from corner to corner |
| abs(UL1 − UL2) | length of each lip from corner to mid |
| abs(RCA2 − CH5) | length of right cheek |
| abs(LCA2 − CH5) | length of left cheek |
| abs(d+e+f) | dist. bet. symmetric plane and mid-ear |
| abs(a+c+j+k+n) | height of body of face |

The layout of the face may also be modified by adjusting the position of key landmark points, thus changing the expression on the face. For example, if a frown is desired, the landmark points representing the lips would be positioned in the shape of an inverted arch as seen if FIG. 1. Alternatively, if a smile were desired, then the landmark points representing the lips would be positioned in the shape of a "U", also shown in FIG. 1. This allows an operator to make the personalized image consistent with the emotion most appropriate for corresponding with text on the page.

Two options exist for completing the personalization process. A two dimensional image may be produced or a three dimensional sculpture may be created. In order to produce a two dimensional image, the program creates an object for each facial feature. This is accomplished by grouping all of the image contained within the geometric shape having the boundaries of its landmark points. Each object is then copied and pasted to a target area according to the layout of landmark points. The copying process is performed such that the proportionality of the layout is maintained regardless of the scaling factor. The target area may vary based on application. For example the target area may be the face of a character in a storybook, or it may simply be the nose of a character. Each target area requiring personalization would include an identifier which would be replaced by a predetermined object. The personalized image may now be printed using an appropriate printing device such as a color printer. The end result is a storybook which contains the image supplied by the customer in the place of the main character's face.

Alternatively, a three dimensional sculpture may be desired for personalizing products such as action figures, dolls, etc. First, the digital computer 12 must be interfaced with a CAM system such as a numerically controlled sculpturing device. A rectangular mold constructed from the target material is selected. The mold is chosen such that its dimensions closely approximate the cubic dimensions and volume of the sculpture to be created. The program interprets the first and second coordinate grids to a three dimensional space and relates the dimensions to the target material. The resulting three dimensional coordinate grid is read one cell at a time. As each cell is read, the program collects information corresponding to contours, depressions, and angles contained in the cell. The information is transmitted directly to the CAM system so that the machine may identically trace, carve, and grind each corresponding cell on the target material. After the cells are reproduced on the target material, a sculpture corresponding to a three-dimensional likeness of the customer is obtained. The personalized piece may be painted or otherwise processed to add certain skin tones, complexion, and highlights necessary to produce a realistic appearance. The personalized piece may then be attached to the mass produced body of an action figure.

It is to be understood that the present invention is not limited to the embodiments described above, but encompasses any and all embodiments within the scope of the following claims.

We claim:

1. A method of creating a digitized likeness of persons comprising the steps:

scanning images from headshot photographs, said scanning step includes scanning a first headshot photograph containing a side view of a person, and scanning a second headshot photograph containing a frontal view of the person;

transmitting data representative of the scanned images to a digital computer;

superimposing a coordinate grid on the scanned images, said superimposing step includes superimposing a first coordinate grid on the scanned image of the side view of the person, and superimposing a second coordinate grid on the scanned image of the frontal view of the person;

identifying point coordinates on the coordinate grid for all facial features using geometric shape inferences;

applying mathematical equations and formulas to determine the natural layout of the facial features in the scanned images;

producing a personalized image in the likeness of the original headshot photographs;

producing a three dimensional personalized sculpture in the likeness of the personalized image comprises:

integrating the digital computer with a Computer Aided Manufacturing system;

selecting a rectangular mold having sufficient cubic dimensions and volume of a desired target material;

constructing a three dimensional grid from the first and second coordinate grids using the digital computer;

interpreting the three dimensional grid on the mold;

reading each cell in the three dimensional grid on the digital computer and transmitting contours and depressions from each grid to the Computer Aided Manufacturing system; and reproducing the contours and depressions from each grid cell upon the mold; and attaching the three dimensional personalized sculpture to a body.

2. A method of creating a digitized likeness of persons as recited in claim 1 wherein:

said step of superimposing a first coordinate grid further comprises the step of moving the first coordinate grid to align its origin with a highest point of the side view defined by the tip of the nose; and said step of superimposing a second coordinate grid further comprises the step of moving the second coordinate grid to align its origin with the tip of the nose;

whereby the origin of both coordinate grids are aligned with the tip of the nose.

3. A method of creating a digitized likeness of persons as recited in claim 2 wherein said step of identifying point coordinates comprises the steps:

identifying point coordinates on the first coordinate grid for facial features using geometric shape inferences; and identifying point coordinates on the second coordinate grid for facial features using geometric shape inferences.

4. A method of creating a digitized likeness of persons as recited in claim 1 further comprising the step of adding skin tones and complexion to the three dimensional personalized sculpture.

* * * * *